United States Patent
Akiyama et al.

(10) Patent No.: US 7,717,349 B2
(45) Date of Patent: *May 18, 2010

(54) SEMICONDUCTOR DEVICE FOR IC TAG, IC TAG AND CONTROL METHOD FOR IC TAG FOR DETECTING AND EXECUTING COMMAND FROM RADIO WAVE

(75) Inventors: Kazuhiro Akiyama, Kanagawa (JP); Hatsuhide Igarashi, Kanagawa (JP); Seiichi Okamoto, Kanagawa (JP); Toshiyuki Miyashita, Kanagawa (JP); Kazumi Seki, Kanagawa (JP); Tatsuya Uchino, Kanagawa (JP); Shigeki Kajimoto, Osaka (JP)

(73) Assignee: NEC Electronics Corporation, Kanagawa (JP)

( * ) Notice: Subject to any disclaimer, the term of this patent is extended or adjusted under 35 U.S.C. 154(b) by 914 days.

This patent is subject to a terminal disclaimer.

(21) Appl. No.: 11/190,833

(22) Filed: Jul. 28, 2005

(65) Prior Publication Data

US 2006/0022058 A1    Feb. 2, 2006

(30) Foreign Application Priority Data

Jul. 29, 2004    (JP) .............................. 2004-222597

(51) Int. Cl.
*G06K 5/00* (2006.01)
*G06K 19/06* (2006.01)
*G08B 13/14* (2006.01)
*H04L 9/32* (2006.01)
*H04B 1/38* (2006.01)

(52) U.S. Cl. .................... 235/492; 235/380; 340/572.1; 340/5.6; 340/5.61

(58) Field of Classification Search ................. 235/492, 235/380, 451, 375, 472.01; 340/10.34, 10.33, 340/825.69, 505, 870.01; 345/691; 375/239; 341/176

See application file for complete search history.

(56) References Cited

U.S. PATENT DOCUMENTS

| 4,323,896 | A | * | 4/1982 | Fiedler et al. ................ 345/691 |
| 4,627,075 | A | * | 12/1986 | Fleming et al. .............. 375/239 |
| 5,030,807 | A | * | 7/1991 | Landt et al. .................. 235/375 |
| 5,632,010 | A | * | 5/1997 | Briechle et al. ............... 345/1.1 |
| 5,654,698 | A | * | 8/1997 | Snelgrove et al. ....... 340/870.01 |
| 5,704,049 | A | * | 12/1997 | Briechle ...................... 715/744 |
| 5,745,068 | A | * | 4/1998 | Takahashi et al. ........... 341/176 |

(Continued)

OTHER PUBLICATIONS

U. Karthaus et al., "Fully Integrated Passive UHF RFID Transponder IC with 16.7-μW Minimum RF Input Power," IEEE Journal of Solid-State Circuits, vol. 38:10, Oct. 2003, pp. 1602-1608.

*Primary Examiner*—Thien M. Le
*Assistant Examiner*—Thien T Mai
(74) *Attorney, Agent, or Firm*—Foley & Lardner LLP (57) ABSTRACT

A semiconductor device for an IC tag comprises a receive unit for demodulating receive data from a received RF signal and a signal processing unit for detecting a command comprising data signals from the receive data demodulated by the receive unit and executing processing based on the command, wherein the signal processing unit has a command acceptance mode for detecting the command from the receive data and a command execution mode for executing the command, and cancels the data signal when the data signal is detected from the receive data in the command execution mode.

14 Claims, 9 Drawing Sheets

U.S. PATENT DOCUMENTS

| | | | |
|---|---|---|---|
| 6,130,603 A * | 10/2000 | Briechle | 340/10.34 |
| 6,198,408 B1 * | 3/2001 | Cohen | 340/825.69 |
| 6,577,232 B1 * | 6/2003 | Hawkinson et al. | 340/505 |
| RE38,338 E * | 12/2003 | Yoshida et al. | 340/825.69 |
| 7,119,664 B2 * | 10/2006 | Roesner | 340/10.33 |
| 7,128,270 B2 * | 10/2006 | Silverbrook et al. | 235/472.01 |
| 7,283,036 B2 * | 10/2007 | Chen | 235/492 |
| 2001/0028300 A1 * | 10/2001 | Matsushita | 340/5.91 |
| 2002/0109603 A1 * | 8/2002 | Otto | 340/691.6 |
| 2003/0233280 A1 * | 12/2003 | Haulk et al. | 705/22 |

* cited by examiner

SEMICONDUCTOR DEVICE FOR IC TAG, IC TAG AND CONTROL METHOD FOR IC TAG FOR DETECTING AND EXECUTING COMMAND FROM RADIO WAVE

BACKGROUND OF THE INVENTION

1. Field of the Invention

The present invention relates to a semiconductor device for an IC tag, an IC tag, and a control method for an IC tag for detecting a command from radio waves transmitted from a reader/writer, and executing it.

2. Description of the Related Art

Recently in physical distribution management at factories and in stock control at retail stores, RFID (Radio Frequency Identification) technology is receiving attention. This is a technology for attaching a tag having an IC, in which the specific information of a product is written, to the product and reading the information via radio antenna.

In this IC tag for RFID (hereafter called IC tag), an IC chip and an antenna are integrated. The IC chip has a memory for storing data. The antenna is installed for receiving radio waves. The IC tag receives RF signals from a reader/writer and performs the operation according to the RF signal. There are two types of IC tags: an active type which comprises a battery, and a passive type which does not comprise a battery. The passive type IC tag receives power from the reader/writer via the RF signals, and secures power for operating the IC chip by this (see Udo Karthaus, et al. "Fully Integrated Passive UHF RFID Transponder IC With 16.7 µW minimum RF input Power", IEEE Journal of Solid State Circuits, Vol. 38, NO. 10, October 2003, pp. 1602-1608). In other words, radio communication by RF signals is performed between the IC tag and the reader/writer, and these RF signals are used for supplying power to the IC tag.

The IC tags are classified into an IC tag for having the enclosed IC chip execute various functions to achieve multi-functions, high performance and high reliability, and an IC tag for simply storing identification numbers and simple information to the enclosed IC chip, depending on the purpose of use. Particularly in the case of the latter IC tag, the major purpose is providing an inexpensive IC tag without having unnecessary functions, and minimizing the area of the enclosed IC chip. The passive type IC tag, which does not enclose a power supply, is a typical example thereof.

As described above, the IC tag acquires a command comprised only of an instruction command, or a command comprised of an instruction command and data by radio communication using RF signals (modulated waves) after modulating the carrier, which is output from the reader/writer. The modulation method is, for example, ASK (Amplitude Shift Keying), PSK (Phase Shift Keying) or FSK (Frequency Shift Keying).

The IC tag receives modulated waves by an antenna. An antenna is roughly classified into an antenna for radiation electromagnetic waves (frequency band primarily used is 2.45 GHz), such as a dipole antenna, and an antenna for induction electromagnetic waves (frequency band primarily used is 13.56 MHz), such as an antenna coil. When the IC tag receives the modulated waves by the antenna, the receive unit of the IC chip demodulates the received data into binary data (digital data) of "0" and "1", according to the modulation method being used. The demodulated digital data is sent to the signal processing unit in the IC chip, where the command is analyzed, and such processing as access to internal memory is performed.

However during the execution of the processing based on the received command in the IC tag, a modulated wave including the frame pulse is being transmitted from the reader/writer. At this time the IC tag continues executing the current processing if only the frame pulse is included in the modulated wave, but if noise is included in the modulated wave other than the frame pulse, and should the IC tag detect this noise as data, it is judged as the arrival of a new command, and the currently executing processing is stopped. In this case, the processing based on the received command cannot be ended normally because of the noise.

SUMMARY OF THE INVENTION

According to a first aspect of the present invention, a semiconductor device for an IC tag comprises a receive unit for demodulating receive data from a received RF signal and a signal processing unit for detecting a command comprising data signals from the receive data demodulated by the receive unit and executing processing based on the command, semiconductor device for an IC tag comprises a receive unit for demodulating receive data from a received RF signal and a signal processing unit for detecting a command comprising data signals from the receive data demodulated by the receive unit and executing processing based on the command, wherein the signal processing unit has a command acceptance mode for detecting the command from the receive data and a command execution mode for executing the command, and cancels the data signal when the data signal is detected from the receive data in the command execution mode.

According to a second aspect of the present invention, an IC tag comprises an antenna for transmitting/receiving RF signals to/from a reader/writer and a semiconductor device for an IC tag according to the first aspect which is connected to the antenna.

According to a third aspect of the present invention, a control method for an IC tag for receiving RF signals transmitted from a reader/writer and executing processing based on receive data acquired by demodulating the RF signals, wherein the IC tag detects a command comprising data signals included in the receive data in command receive mode, executes the detected command in command execution mode, and cancels the data signal when the data signal is detected from the receive data in the command execution mode.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Embodiments of the present invention will now be described in detail with reference to the drawings. This embodiment of the present invention is applied to the passive type IC tag and the control method thereof. For the IC tag to communicate, a reader/writer for reading and writing data from/to the IC tag is necessary. The passive type IC tag receives power from the reader/writer via the RF signal, and operates the IC chip by this power. Here a transmission/reception system (RFID system) comprising an IC tag and a reader/writer will be described first.

Figure 1:
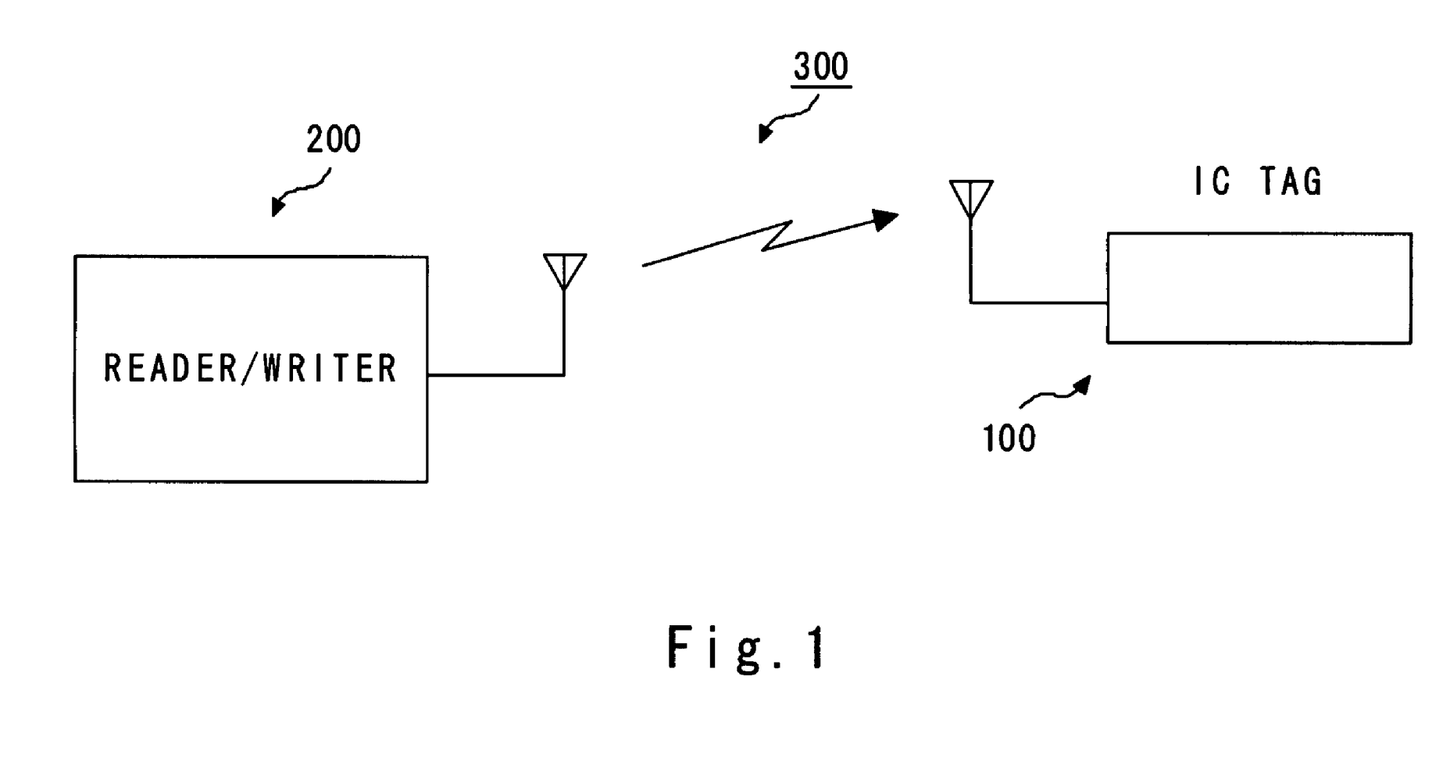
FIG. 1 is a diagram depicting the RFID system comprising an IC tag and a reader/writer according to an embodiment of the present invention.

FIG. 1 is a diagram depicting the RFID system comprising an IC tag and a reader/writer. The RFID system 300 comprises an IC tag 100 and a reader/writer 200, and the IC tag 100 communicates using the RF signals received from the reader/writer 200.

The reader/writer 200 is communicably connected with a computer (not illustrated), and operates according to the instructions of this computer. The IC tag 100 comprises a memory for storing data and an antenna for receiving RF signals. When the IC tag 100 enters the RF field created by the reader/writer 200, the power is supplied to the IC tag 100 via the RF signals. These RF signals include a command, and the IC tag 100 receives this command and writes predetermined data to the memory of the IC tag 100, or reads data from the memory and transmits it to the reader/writer 200. In this way, data is transmitted/received between the IC tag 100 and the reader/writer 200.

Figure 2:
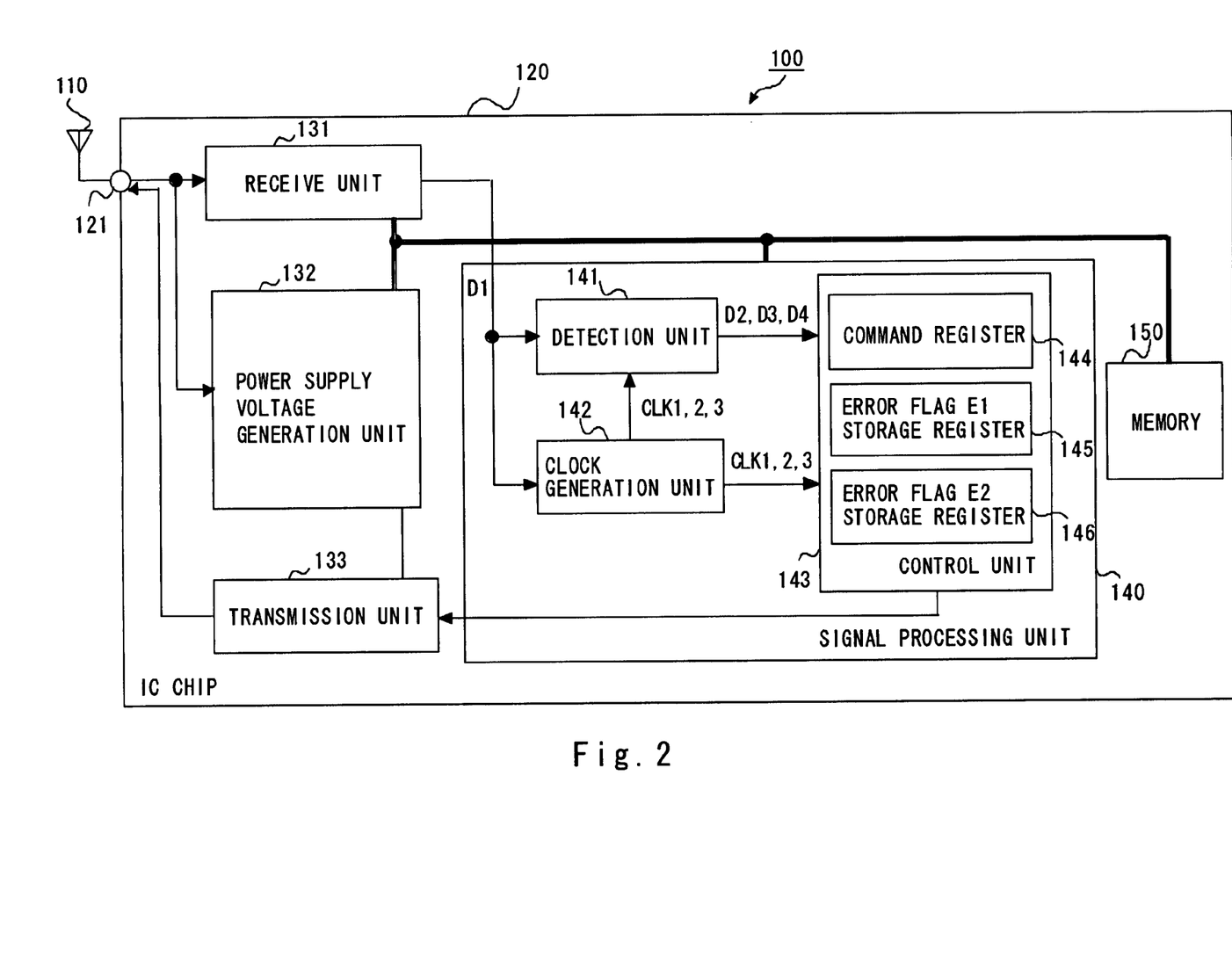
FIG. 2 is a unit diagram depicting the IC tag according to an embodiment of the present invention.

FIG. 2 shows a block diagram depicting the IC tag 100 according to the present invention, and the IC tag 100 comprises an antenna 110 for transmitting/receiving radio waves to/from the reader/writer 200, and an IC chip 120. The RF signals received from the antenna 110 are supplied to the IC chip 120 via the antenna connection terminal 121. The IC chip 120 comprises a receive unit 131 for demodulating these RF signals to generate receive data, a power supply voltage generation unit 132 for generating power supply voltage from the RF signals, a transmission unit 133 for generating RF signals to be transmitted to the reader/writer 200, a signal processing unit 140 to which the receive data is supplied, and a non-volatile memory 150 such as EEPROM. The IC chip 120 in the present embodiment is a passive type semiconductor device for RFID for extracting power and data from the received RF signals.

The receive unit 131 demodulates the data (receive data), included in the RF signals received via the antenna 110, in digital format. The receive data demodulated by the receive unit 131 includes at least the "0" and "1" data of an instruction command constituting the above mentioned command, and the reference signal (frame pulse), which is a signal to be a reference of a timing for generating a clock signal required for the operation of the signal processing unit 140.

The transmission unit 133 receives the read data, which was read from the memory 150 according to an instruction of the reader/writer 200, from the signal processing unit 140, and sends it to the reader/writer 200 via the antenna 110.

The power supply voltage generation unit 132 generates the power supply voltage for the IC chip 120 to operate from the RF signals transmitted from the reader/writer 200 when the distance from the reader/writer 200 is in a predetermined range.

The memory 150 can be a non-volatile memory, such as EPROM (Erasable Programmable ROM), EEPROM (Electrically Erasable Programmable ROM), flash memory, FeRAM (Ferroelectric RAM), MRAM (Magnetic RAM) or OUM (Ovonic Unified Memory), and stores various data, such as individual information. If such a non-volatile memory as EEPROM and flash memory is used as the memory 150, the logical circuit constituting the signal processing unit 140 operates with a voltage similar to the minimum operable voltage during reading, but requires high voltage during writing compared with the voltage required for reading. Therefore a normal writing operation cannot be performed unless the voltage value of the writing voltage is a required value or more, so a charge pump circuit (not illustrated) for boosting the generated power supply voltage to generate the voltage required for writing, for example, can be installed inside or outside the memory 150.

The signal processing unit 140 detects a command from the receive data demodulated by the receive unit 131, and executes processing, such as writing data to the memory 150 or reading data from the memory 150 according to the command, and has a command receive mode in which a command is detected from the data received as the receive data, and a command execution mode in which a detected command is executed. Particularly in the command receive mode, if there is a receive data indicating that "0" or "1" data does not exist within the range of at least the number of bits of data to indicate the instruction command (e.g. 16 bits of data) out of the demodulated receive data, the signal processing unit 140 of the present embodiment prevents a malfunction which occurs by receiving unintended receive data, and stores the history that a command, which was supposed to be received, could not be received. The receive data where data does not exist has only frame pulses, and the receive data having "0" or "1" data comprise frame pulses and data. Whereas in the command execution mode, if a command which is supposed to be received can be received during the command receive mode period, the received command is executed. If a new command is received in this command execution mode, this received command is cancelled, regarding it as a command which is not supposed to be received (normally a command is received only during the command receive mode period), and a malfunction caused by receiving unintended receive data is prevented.

This signal processing unit 140 comprises a detection unit 141 for generating the later mentioned detection signal from the receive data, which is output from the receive unit 131, a clock generation unit 142 for generating a plurality of clock signals required for operating the sequential circuit of the detection unit 141 and the control unit 143 from the receive data, and a control unit 143 for performing such processing as writing data to or reading data from the non-volatile memory 150 by acquiring a command from the detection signal detected by the detection unit 141, and executing the command at a predetermined timing according to the clock signal generated by the clock generation unit 142. The control unit 143 also has a command register 144 holding the command included in the detection signal.

Now the signal processing unit 140 will be described in detail. The clock generation unit 142 generates a plurality of types of clock signals by delaying a frame pulse included in the receive data for a predetermined time, for example, and supplies them to the detection unit 141 and the control unit 143.

The detection unit 141 detects the frame pulse and the data signals, which indicates "0" or "1", based on the receive data transferred from the receive unit 131 and the above mentioned clock signals, and transfers the detected detection signal to the control unit 143.

The control unit 143 loads the data signal indicating "0" or "1", out of the detection signals detected by the detection unit 141, to the command register 144 in serial, and checks the validity of the receive data after loading is completed. The validity of the command can be confirmed by checksum or a cyclic redundancy check (CRC) (ISO/IEC FDIS 18000-4: 2003 (E), Information technology—Automatic identification and data capture techniques—Radio frequency identification for item management—Part 4: Parameters for air interface communications at 2.45 GHz, pp. 17-20). For example, the checksum data included in the command transmitted from the reader/writer 200 and the value of the checksum calculated from the transmitted command are compared, and it is detected whether the command was accurately received. After checking the validity, the command is decoded and executed.

The control unit 143 receives the write instruction and read instruction acquired by decoding the received command, a control signal for instructing setting or resetting of the later mentioned error flag, and a plurality of types of clocks which are output from the clock generation unit 142, and writes or reads data to/from the register or non-volatile memory 150, or executes each command, such as the set or reset of a flag, and stores data to be transmitted to the reader/writer 200, converts codes of the data, and transfers them to the transmission unit 133.

Figure 3:
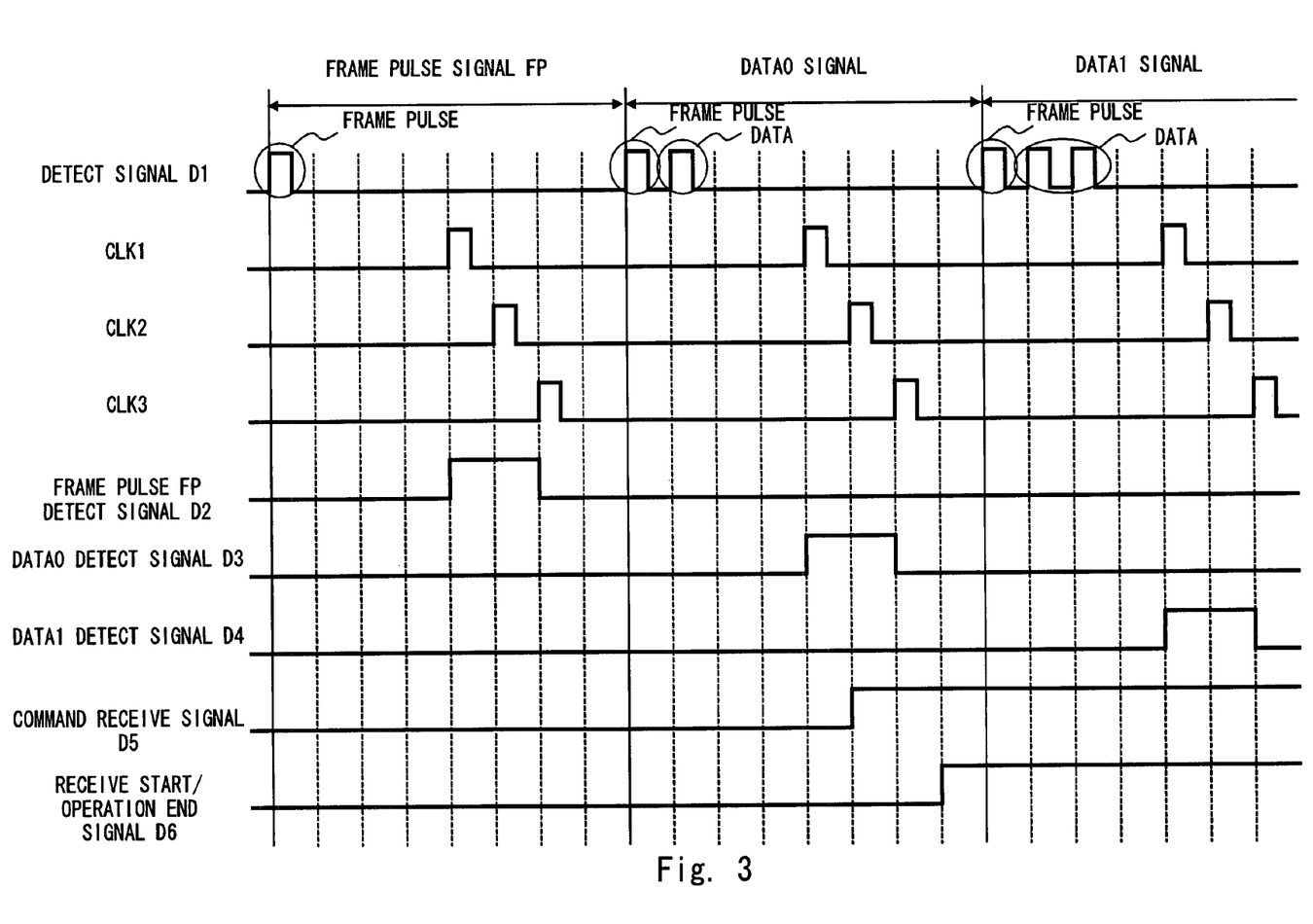
FIG. 3 is a timing chart depicting the signal generated in the IC tag according to an embodiment of the present invention.
Figure 4:
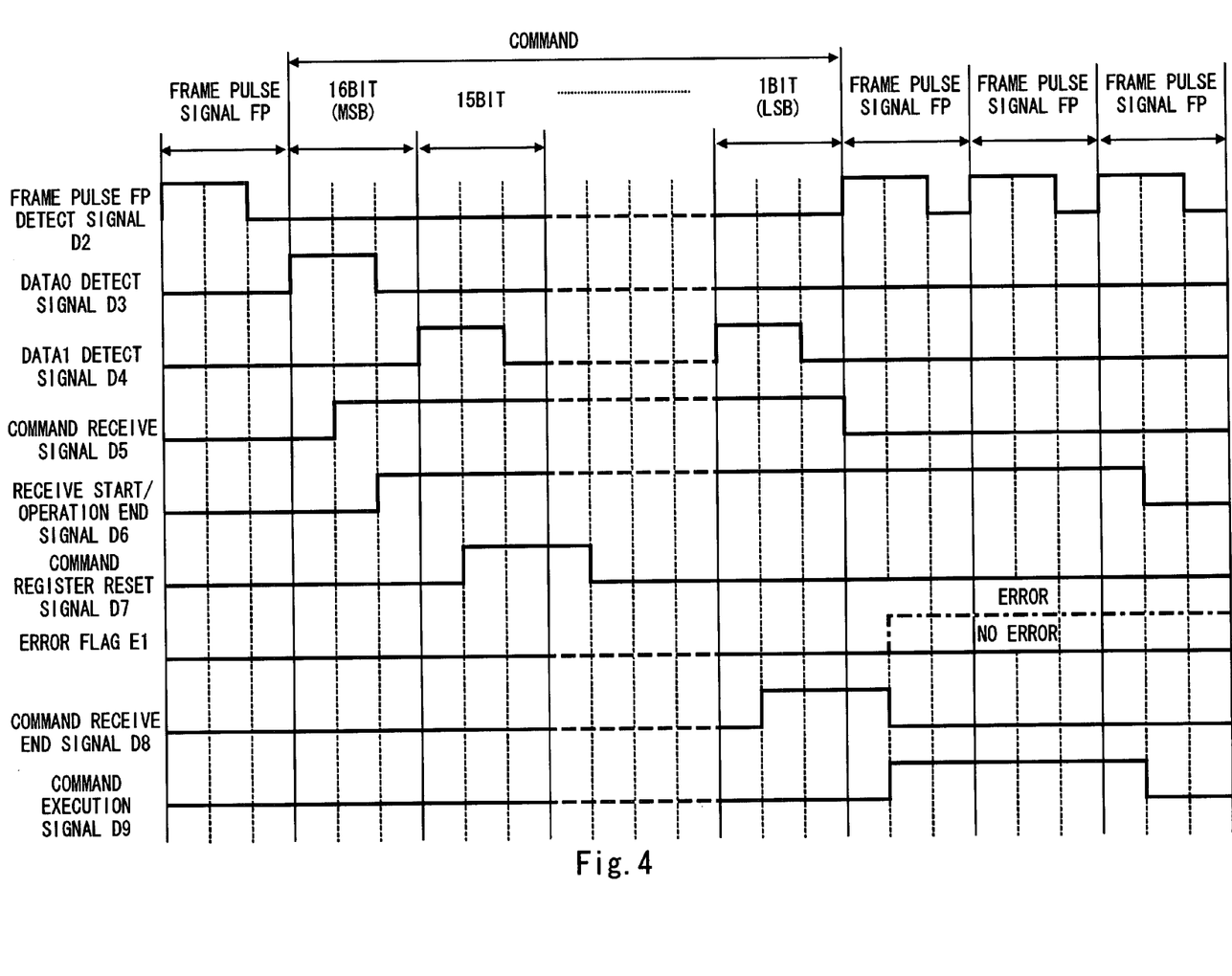
FIG. 4 is also a timing chart depicting the signal generated in the IC tag according to an embodiment of the present invention.

Now the operation of the IC tag 100 according to the present embodiment will be described. FIG. 3 and FIG. 4 are timing charts depicting the signals generated in the IC tag 100. The DETECT signal D1 shown in FIG. 3 is a receive data which is demodulated by the receive unit 131 in digital format. This demodulated receive data is classified into a frame pulse FP signal comprised only of a frame pulse, and a DATA0 signal or a DATA1 signal comprised of a frame pulse and data. The DATA0 signal is comprised of a frame pulse and one pulse, and the DATA1 signal is comprised of a frame pulse and two pulses.

In the present embodiment, the second pulse after this frame pulse functions as an identification signal to indicate whether the demodulated receive data is a frame pulse FP signal comprised of only a frame pulse, or a data signal comprised of a DATA0 signal or a DATA1 signal. If this second pulses exists, the received data is a data signal "0" or "1", and if this second pulse does not exist, the received data is a frame pulse FP signal.

The third pulse, after this second pulse, functions as a data identification signal to indicate the content of the data signal, and if the third pulse exists, the data signal is "1", and if the third pulse does not exist, the data signal is "0".

In the command execution mode, the IC tag 100 receives the frame pulse FP signal which includes only a frame pulse, and in the command receive mode, the IC tag 100 receives the data signal, either a DATA0 signal or a DATA1 signal.

The receive unit 131 demodulates the received radio wave into a DETECT signal D1 which indicates either a frame pulse FP signal or a DATA0 or a DATA1 signal, and supplies the result to the detection unit 141 and the clock generation unit 142.

The clock generation unit 142 generates clocks from the first frame pulse of the DETECT signal D1. The frame pulse is a pulse having a predetermined cycle, and is a signal that is always included in the DETECT signal D1. This frame pulse is a reference of the timing of the clock for the sequential circuit in the signal processing unit, so normally while the IC chip 120 is operating, this frame pulse is continuously supplied from the reader/writer 200. The clock generation unit 142 generates three types of clocks, CLK1-CLK3, by delaying the frame pulse for an appropriate time, for example, and supplies them to the detection unit 141 and the control unit 143. In the present embodiment, the clock generation unit 142 generates three types of clocks, CLK1-CLK3, but may generate a plurality of clocks to be needed. Also the clock generation unit may be installed inside the detection unit 141 or in a pre-stage of the signal processing unit 140, for example.

The detection unit 141 receives the DETECT signal D1 and the clocks CLK1-CLK3, and generates a frame pulse detection signal D2 if the DETECT signal D1 is a frame pulse FP signal, generates a DATA0 detection signal D3 as a data signal indicating the detection of "0" if the DETECT signal D1 is a DATA0 signal, and generates a DATA1 detection signal D4 as a data signal indicating the detection of "1" if the DETECT signal D1 is a DATA1 signal, and transfers these detection signals D2-D4 to the control unit 143.

In other words, the detection unit 141 counts the number of pulses of the DETECT signal D1 included in one cycle (one frame) of the frame pulse, and generates the frame pulse detection signal D2 if the number of pulses is 1, the DATA0 detection signal D3 if the number of pulses is 2, and the DATA1 detection signal D4 if the number of pulses is 3. Hereafter the DATA0 detection signal D3 and the DATA1 detection signal D4 are collectively called "data signals".

In the present embodiment, the detection unit 141 generates the detection signal by counting the number of pulses of the DETECT signal D1 included in one frame, where a frame pulse FP signal is generated if the number of pulses included in one frame is 1, a DATA0 signal is generated if the number of pulses is 2, and a DATA1 signal is generated if the number of pulses is 3. However not only the number of pulses included in one frame, but also the timing of the pulses included in one frame may be considered to judge the content of a data signal, whether it is a DATA0 signal or a DATA1 signal.

Here if the case, when three pulses are detected continuously with a predetermined space in a frame, is represented as "111", the frame pulse FP signal of this embodiment can be represented as "100", the DATA0 signal as "110", and the DATA1 signal as "111". If the timing of the pulses included in one frame is considered, the DATA0 signal can be corresponded with "101", and the DATA1 signal as "110", for example.

Based on the various detection signals D2-D4 from the detection unit 141 and the clock signals CLK1-CLK3 from the clock generation clock 142, the control unit 143 generates signals to indicate various timings, such as a command receive signal D5 which becomes high level during the command receive period, the receive start/operation end signal D6 which becomes high level from the start of command receiving to the end of execution of the command, the command receive end signals D8 to indicate the end of command receiving, the command execution signal D9 which becomes high level during the command execution period, and the command register reset signal D7 for resetting the command register 144.

Specifically when the DATA0 detection signal D3 or the DATA1 detection signal D4 is received, the control unit 143 sets the command receive signal D5 to high level. The command receive signal D5 is a signal to be high level in a period of receiving (detecting) a command, and during this time, the control unit 143 is in command receive mode. When the command receive signal D5 is set to high level, the control unit 143 also sets the receive start/operation end signal D6 to high level. This receive start/operation end signal D6 is in high level, from the command receive start to the end of command execution.

As FIG. 4 shows, when the command receive signal D5 becomes high level, the control unit 143 generates the command register reset signal D7 for resetting the command register 144, and resets the command register 144. By this, the data signals to be received in the subsequent command receive period are loaded with certainty. The command register 144 receives the DATA0 detection signal D3 or the DATA1 detection signal D4, and sequentially loads the data "0" or "1" during the command receive period. Here the command shown in FIG. 4 is 16 bits of a command string, and according to the present embodiment, the higher three bits thereof are reserve bits, and the command register 144 is reset at the second bit. The command is not limited to 16 bits of a command string, but may be 24 bits of a command string, for example. If the reserve bits are not set, the command register 144 may be reset at the point when the processing enters command receive mode.

When the command receive signal D5 becomes high level, counting starts by the counter (not illustrated), and at the point when the count value reaches a predetermined value, the control unit 143 generates the command receive end signal D8 to indicate the end of receiving of commands, and sets the command receive signal D5 to low level and the command execution signal D9 to high level. This command execution signal D9 is high level during the command execution period, which is a period for executing the received command, and the control unit 143 enters the command execution mode. And when the counter value of the counter reaches a predetermined value, the control unit 143 sets the receive start/operation end signal D6 and the command execution signal D9 to low level, and cancels the command execution mode.

Figure 5:
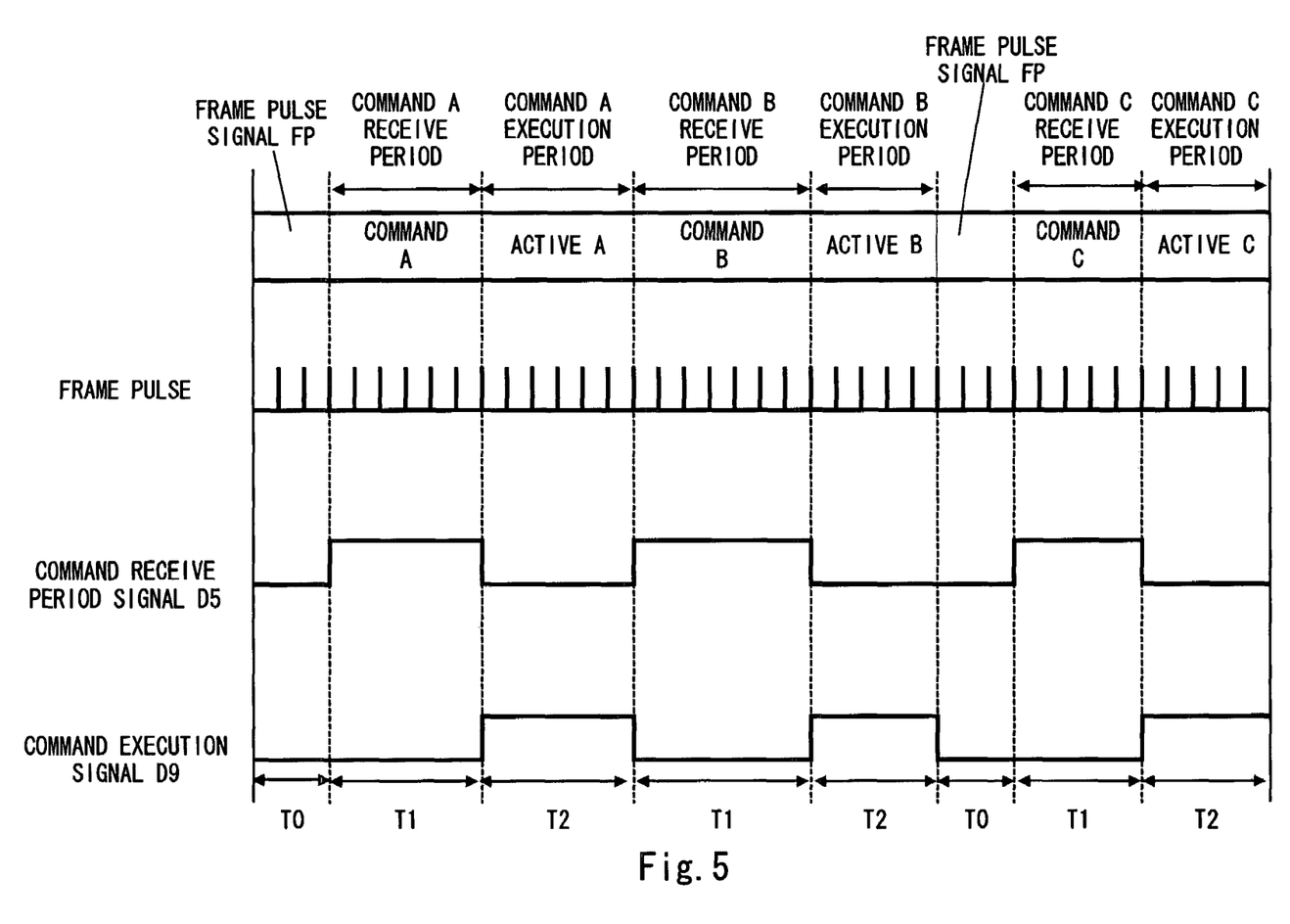
FIG. 5 is a diagram depicting the command receive period and the command execution period in the IC tag according to an embodiment of the present invention.

In other words, as FIG. 5 shows, the IC tag 100 in the present embodiment is in the frame pulse receive mode during the frame pulse receive period T0 when only the frame pulse FP signal is received, is in command receive mode during the command receive period T1 when a command is received, and is in command execution mode during the command execution period T2 when the command is executed. The frame pulse receive period T0 is a period when both the command receive period D5 and the command execution signal D9 are both in low level, and is a period when the IC tag is receiving only the frame pulse FP signal before receiving a command or after the command is executed, and is not executing or receiving a command. The command receive period T1 is a period when the command receive signal D5 is in high level, and is a period when the IC tag receives the DATA0 detection signal D3 and the DATA1 detection signal D4, and detects the command. The command execution period T2 is a period when the command execution signal D9 is in high level, and is a period when the IC tag executes processing according to the command which is received and detected in the command receive period T1.

For example, the case in FIG. 5, where the command A and the command C are write commands for instructing to write data, and the command B is a read command for instructing to read data, will be described. The write command is comprised of a write instruction, data to be written, and an address of a memory to which this data is written, and the read command is comprised of a read instruction, and an address of a memory from which the data is read. The read command in the command B in FIG. 5 is for processing to confirm whether the write command of the command A was executed normally, so the memory addresses included in the command A and the command B are the same addresses.

Now the operation of the control unit 143 according to the present embodiment will be described in detail. When the DATA0 detection signal D3 or the DATA1 detection signal D4 is received from the detection unit 141 in the frame pulse receive period T0, which is in the frame pulse receive mode for receiving the frame pulse FP signal, the control unit 143 sets the command receive signal D5 to high level to enter the command receive mode.

Figure 6:
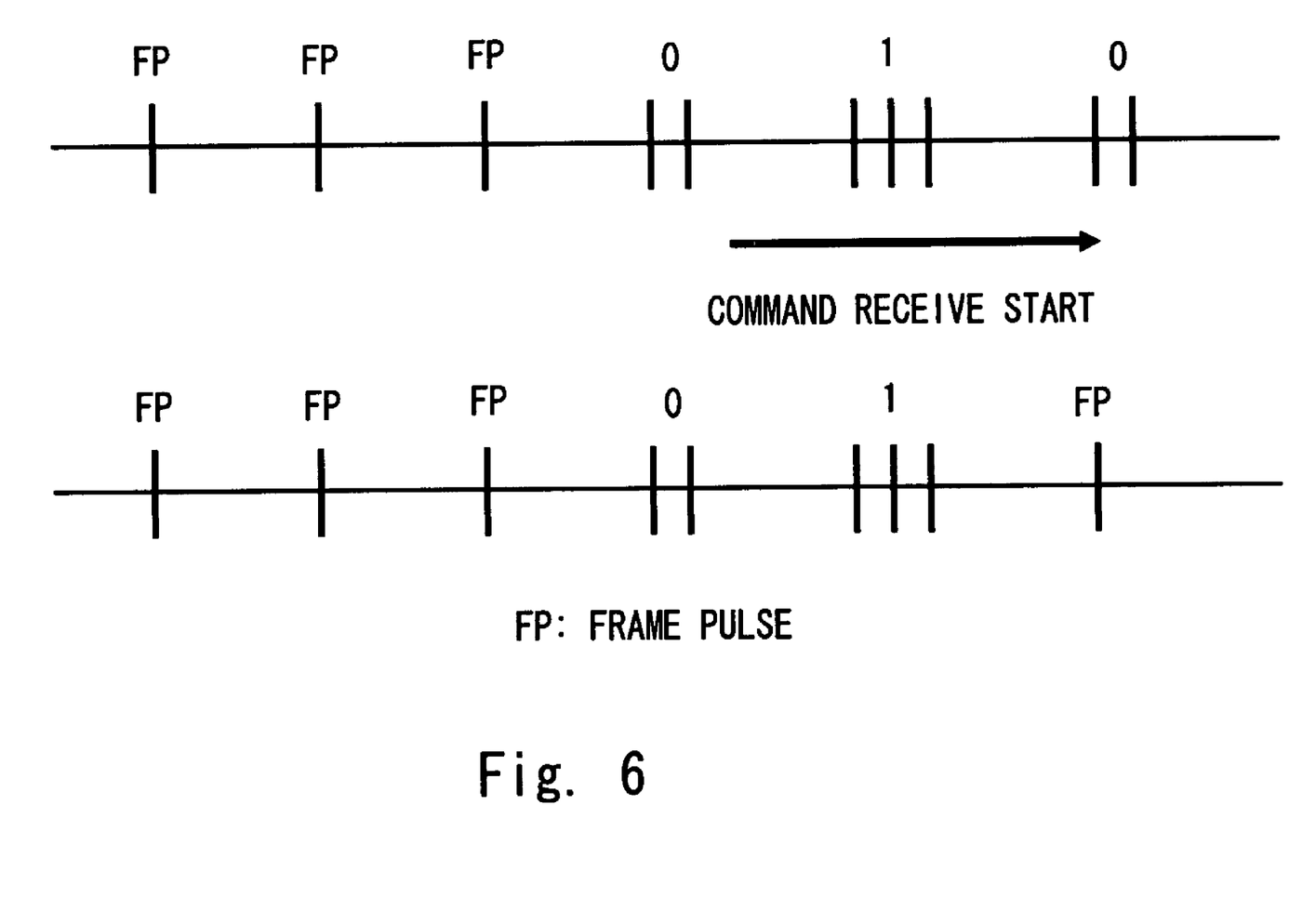
FIG. 6 is a diagram depicting the case when a normal receive data is received and the case when an incorrect receive data is received.

In the command receive mode, the control unit 143 receives only the DATA0 detection signal D3 or the DATA1 detection signal D4, as the upper diagram in FIG. 6 shows, until the reception of the command ends, that is during the command receive period T1 when the command receive signal D5 is in high level, and detects a command from the received DATA0 detection signal D3 or the DATA1 detection signal D4.

In the command receive period T1, the frame pulse detection signal D2 is not supposed to be input. However if the above mentioned second and/or third bit signal cannot be demodulated for such a reason as the influence of disturbance, the detection unit 141 detects the frame pulse detection signal D2, instead of the DATA0 detection signal D3 or the DATA1 detection signal D4, from the DETECT signal D1, and transfers it to the control unit 143, as the bottom diagram in FIG. 6 shows.

Figure 7:
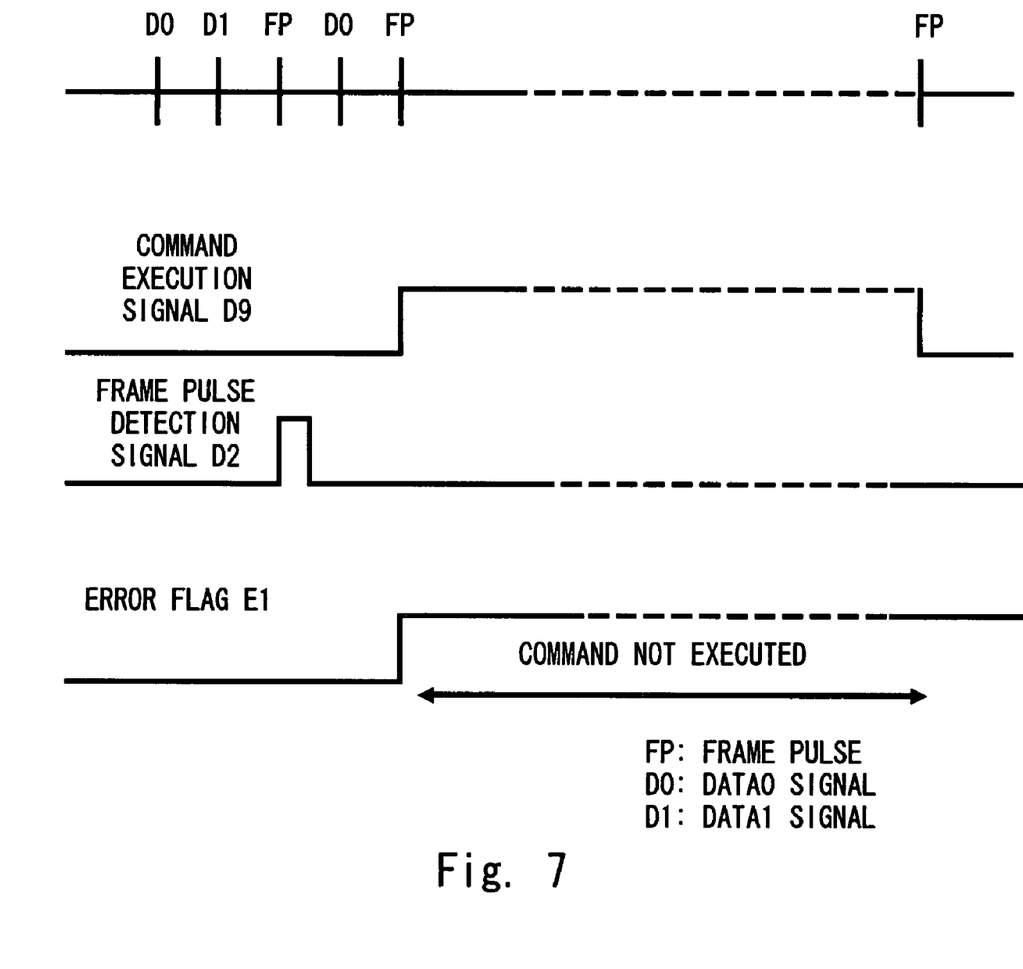
FIG. 7 is a diagram depicting the signals generated in the control unit when incorrect data is received.

If the control unit 143 receives the frame pulse detection signal D2 during the command receive period T1, the control unit 143 according to the present embodiment judges that the DATA0 detection signal D2 or the DATA1 detection signal D3, which is supposed to be received, could not be received, or that demodulation was incorrect, and cancels the currently receiving command. In other words, in the current command receive period T1, the data string comprised of the DATA0 detection signal D3 or the DATA1 detection signal D4, which is being loaded into the command register 144, is cancelled. In this way, the control unit 143 cancels the currently receiving command if data other than the DATA0 detection signal D3 or the DATA1 detection signal D4, that is the frame pulse detection signal D2, is received. If the frame pulse detection signal D2 is received during the command receive period T1, the control unit 143 generates the error flag E1, as shown in FIG. 7, and stores it in the error flag E1 storage register 145. The control unit 143 executes the command, which was received in the command receive period T1, in the command execution period T2 (period when the command execution signal D9 is in high level), which comes after the command receive period T1, but if the error flag E1 is generated, the command is cancelled and is not executed.

Here the validity of the command is also confirmed by checksum, and the confirmation method by checksum is a simple confirmation method where the lower 1 byte is extracted from the total of the data of a command string sequentially added from the beginning, and is compared with the checksum data which is transmitted along with the command, and the validity of the command is judged whether these match or not. If the received command string cannot be received as a data signal, in other words if it is received as a frame pulse FP signal, then it is still unknown whether this data is supposed to be "0" or "1", therefore if this is regarded as the DATA0 detection signal D3 or the DATA1 detection signal D4 incorrectly, a malfunction occurs, which means that the confirmation system by checksum cannot completely prevent a malfunction. In this case, a malfunction can be completely prevented by canceling the currently receiving command string itself.

If the error flag E1 read instruction by the reader/writer 200 is received, the IC tag 100 reads the stored error flag E1 from the error flag E1 storage register 145, and transmits it to the reader/writer 200. Since the error flag E1 read instruction is a type of command, it is received in the command receive mode (corresponds to the command receive period T1 in FIG. 5), just like the case of a write instruction or a read instruction for the memory.

In the general passive type IC tag, an IC chip having only the minimum necessary functions is enclosed to decrease cost and size, and the IC tag has no function to confirm whether a write instruction by the reader/writer has been correctly executed. So as a method for confirming whether a write instruction to the IC tag has been correctly executed, the data written in the IC tag by the write instruction is read from the IC tag by the read instruction, and judges whether the data written by the reader/writer and the data read from the IC tag match or not, and if there is a match, it is regarded that the write instruction has been normally executed, and if not a match, this is regarded that the write instruction has not been normally executed. In other words, when the write instruction is sent to the IC tag, the read instruction specifying the memory address, the same as the memory address specified by the write instruction, is also sent immediately after the write instruction, and whether the write instruction has been executed normally is confirmed. This means that the write data written by the write instruction and the read data read by the read instruction are compared, and normal write processing is confirmed whether they match or not.

In such a general IC tag, even if it can be confirmed that the write instruction could be not normally executed, since write data does not match the read data due to the frame pulse included in the received command string, for example, and the reader/writer cannot know why the write instruction to the IC tag was not correctly executed.

Possible causes as to why the write operation could not be correctly executed are not only the above mentioned failure of receiving a command, but also, for example, because of the distance between the reader/writer and the passive type IC tag, which is a predetermined distance or more, where the necessary energy to generate the required write voltage could not be received sufficiently when the data is written to the non-volatile memory (insufficient generation of boosting voltage by the charge pump circuit). In such a case, there is no way for the reader/writer to confirm whether the write instruction could not be executed normally either because receiving a command failed or the write instruction could not be executed normally due to an insufficiency of the boosting voltage.

When the write instruction could not be normally executed, the write instruction is sent again. But a general RFID system cannot clearly know the cause of a failure in a normal execution of a write instruction, so it is quite possible that the write instruction cannot be normally executed again, for the same reason, even if the write instruction is sent again.

In the case of the present invention, if a command reception fails, the control circuit 143 outputs the error flag E1, and stores it in the error flag E1 storage register 145. If the error flag read instruction transmitted from the reader/writer 200 is received, the control circuit 143 reads the error flag E1 from the error flag E1 storage register 145, and outputs it to the transmission unit 133. The transmission unit 133 modulates the received error flag E1, and transmits it to the reader/writer 200. The reader/writer 200, which received the error flag E1 transmitted in this way, can know that a command receive failure occurred in the IC tag 100. Therefore given that a command receive failure will not occur to the IC tag 100 again, the command can be transmitted again under different transmission conditions to the IC tag 100 from the one which failed before, so the regeneration of an error due to the same error-cause can be decreased with certainty.

The IC tag 100 could voluntarily read the error flag E1 from the error flag E1 storage register 145 and transmit it to the reader/writer 200. However generally an RFID system has a characteristic in that a plurality of IC tags can be transmitted to/received from one or more reader(s)/writer(s). Therefore in an RFID system, anti-collision is always considered (data collision prevention function), and it is not desirable that the IC tag voluntarily transmits data other than the data transmitted from the IC tag corresponding to the commands transmitted from the reader/writer.

Therefore in the above mentioned case, when the read instruction, for confirming that correct write processing has been performed for a write instruction transmitted from the reader/writer 200, is received, and when the error flag E1 is ON due to the failure of receiving a write instruction, for example, the IC tag 100 may voluntarily send the error flag E1, without sending the read data. By this, the number of times of transmissions and receptions between the IC tag 100 and the reader/writer 200 is not increased unnecessarily, because this is a data transmission for the instruction command to the reader/writer 200, even if this is a voluntary data transmission by the IC tag 100. This case involves an instruction command responding to the reader/writer 200. Also it is unnecessary to send an instruction to read the error flag E1, so the number of times of transmission/reception between the IC tag 100 and the reader/writer 200 can be decreased.

When receiving a command ends, the processing shifts to the command execution mode where the command received in the command receive period T1 is executed. As described above, if the frame pulse FP signal is detected in the command receive period T1, the command is canceled. So the command can be executed in the command execution mode only when the command was normally received in the command receive period T1.

In the command execution mode, the IC tag 100 receives radio waves including the frame pulse FP signal as the DETECT signal D1 from the reader/writer 200 and executes the command in the command execution period T2 until the end of execution of the command. The clock generation unit 142 generates various clocks required for command execution from the frame pulse FP signal.

The DATA0 detection signal D3 or the DATA1 detection signal D4 are signals which are not supposed to be generated in this command execution period T2, but because of the influence of a disturbance, for example, the signal at the second bit or the third bit may be demodulated, and the DATA0 detection signal D3 or the DATA1 detection signal D4 may be generated by the detection unit 141 and be input to the control unit 143. If the control unit 143 recognizes this as a command, the command execution may be interrupted or stopped and switched to the command receive mode, or a command may be received while executing a command, or the newly received command may be executed. To prevent such malfunctions, the control unit 143 cancels the command if the DATA0 detection signal D3 or the DATA1 execution signal D4 is detected in the command execution period T2. To cancel a command, the DATA0 detection signal D3 and the DATA1 detection signal D4 may be fixed in low level in the detection unit 141 while the command execution signal D9 is in high level.

When the DATA0 detection signal D3 or the DATA1 detection signal D4 is input to the command execution period T2, the control unit 143 may not only cancel this, but also may generate the error flag E2 and store it in the error flag E2 storage register 146. In other words, if the DATA0 detection signal D3 or the DATA1 detection signal D4, which the read/writer 200 should not transmit, is detected in the IC tag 100 in the command execution mode, this means that the communication status between the reader/writer 200 and the IC tag 100 is not good. So the reader/writer 200 may read the error flag E2 of the IC tag 100 when necessary or the IC tag 100 may automatically send this error flag E2 to the reader/writer 200, to notify of the deterioration of the receive status.

By this, the IC tag 100 can notify the reader/writer 200 that abnormal data was received in the command execution period, and the reader/writer 200 can perform such a processing as issuing the same command again to the IC tag 100, or issuing a sound to notify that the radio wave status with the IC tag 100 is not good.

Figure 8:
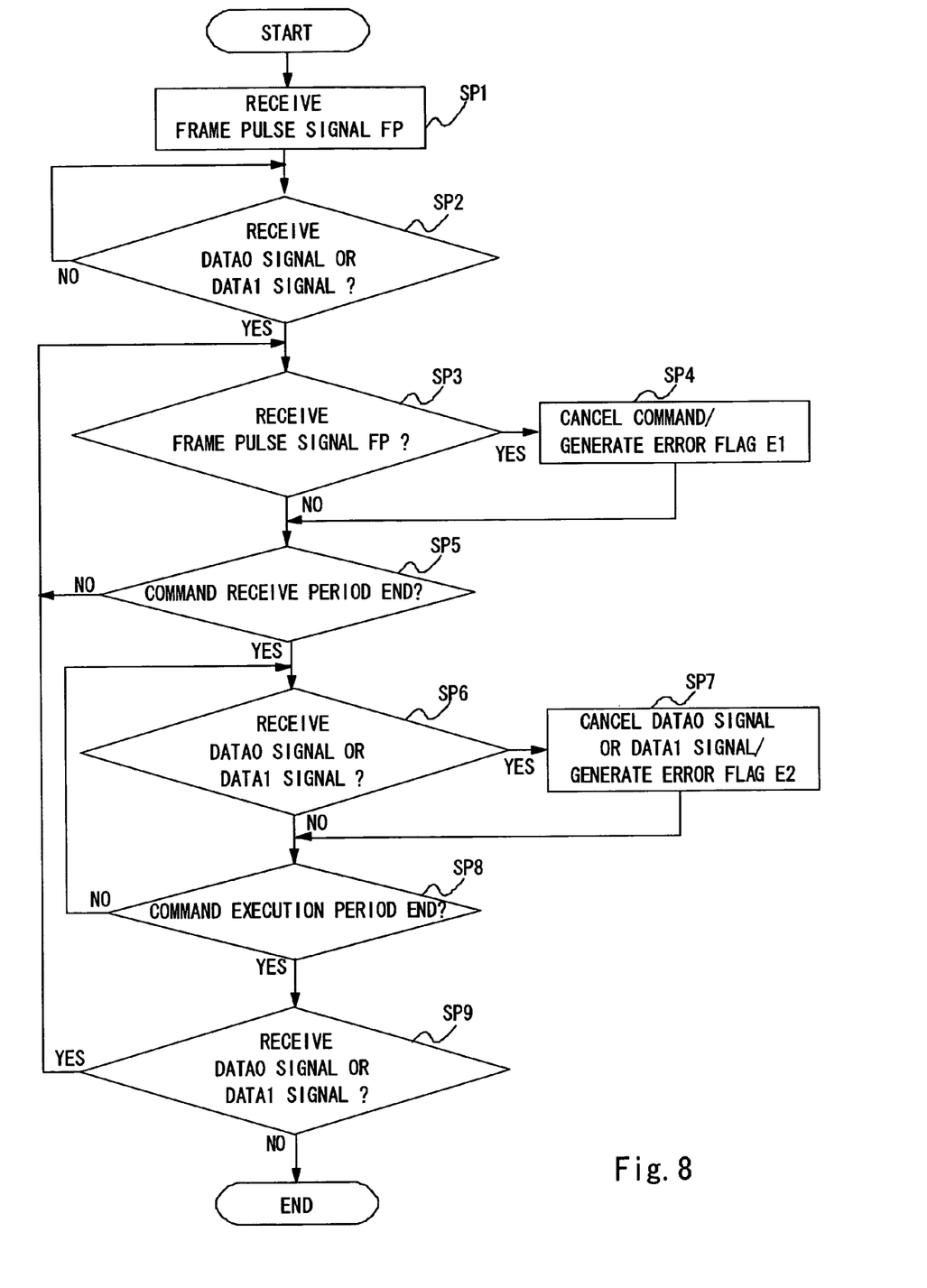
FIG. 8 is a flow chart depicting the transmission/reception operation of the IC tag according to an embodiment of the present invention.
Figure 9:
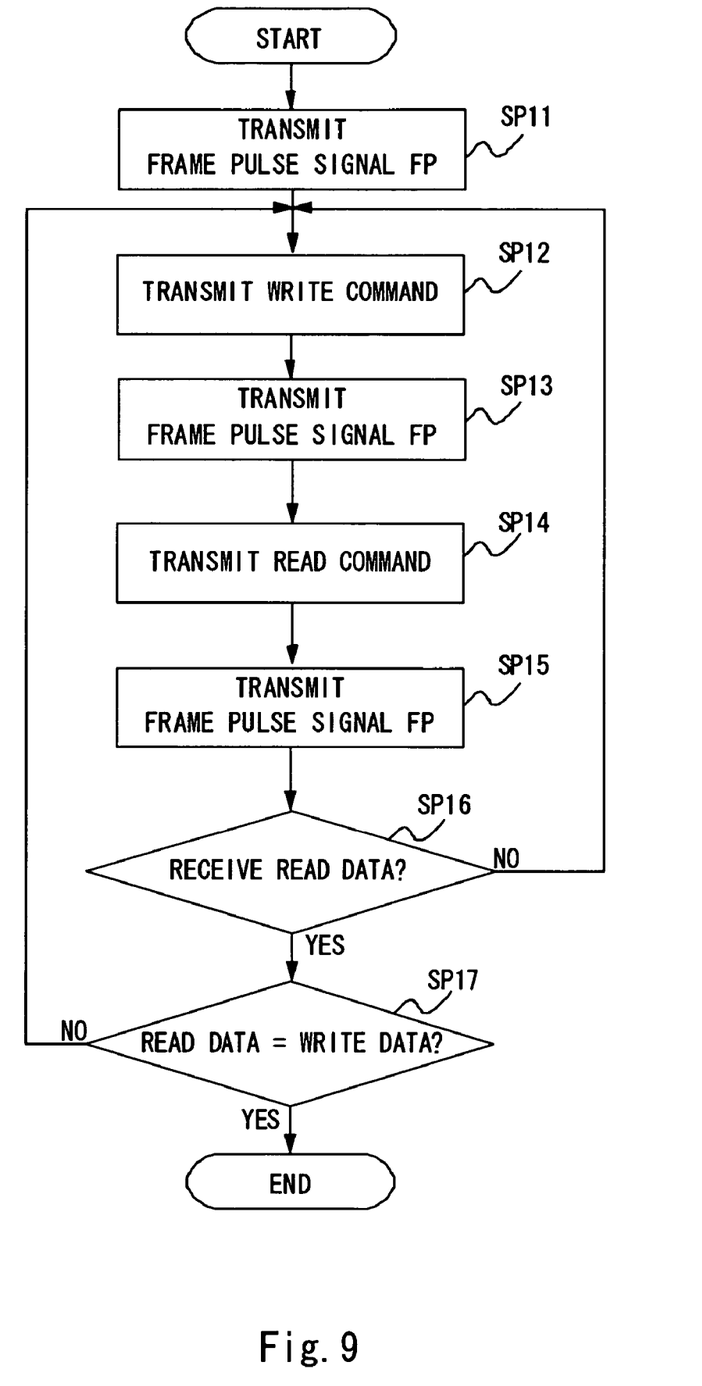
FIG. 9 is a flow chart depicting the transmission/reception operation of the reader/writer according to an embodiment of the present invention.

Now an example of transmission/reception between the IC tag 100 and the reader/writer 200 will be described. FIG. 8 is a flow chart depicting the transmission/reception operation of the IC tag 100, and FIG. 9 is a flow chart depicting the transmission/reception operation of the reader/writer 200.

As FIG. 8 shows, the IC tag 100 receives the carrier transmitted from the reader/writer 200 and the RF signal including the frame pulse FP signal, and generates the power supply voltage, and also initializes the logical circuit constituting the signal processing unit 140 and generates clock signals (step SP1). The IC tag 100 is in the frame pulse receive mode, which is a period other than the command receive and execution periods, and in which only the frame pulse is received as receive data (corresponds to the period T0 in FIG. 5).

When the command transmitted from the reader/writer 200 is received after a predetermined time has elapsed (step SP2: YES), the IC tag 100 enters the command receive mode. For example, if a write command is received, a command comprised of a write instruction, write destination address and write data is received. In the command receive mode, if data other than the DATA0 signal or the DATA1 signal included in the receive data, acquired by demodulating the received RF signal (frame pulse FP signal in the case of the present embodiment) is received (step SP3: YES), the currently receiving command is canceled. At this time, the error flag E1 is generated and is stored in the error flag E1 storage register 145 in the control unit 143 (step SP4).

Receiving the command continues until the command receive period ends, and when the command receive period ends (step SP5: YES), the command execution mode, in which the receive command is executed, starts. If the error flag E1 is generated in step SP4, the command is not executed.

If the received command is a write command, the processing to write the received data in a predetermined address of the memory 150 is executed. In this command execution mode, an RF signal including only the frame pulse is transmitted from the reader/writer 200. Therefore if data other than the frame pulse FP signal included in the receive data acquired by demodulating the RF signal is received in the command execution period (DATA0 signal or DATA1 signal in the case of the present embodiment) (step SP6: YES), this data is canceled regarded this as abnormal data. At this time, this abnormal data may simply be discarded, but the error flag E2 may be generated and stored in the error flag E2 storage register 146 in the control unit 143 (step SP7).

And the frame pulse FP signal is received until the command execution period ends, and the reception of data, such as the DATA0 signal or the DATA1 signal, is canceled, and the command is executed. After the command execution period ends, the frame pulse receive mode or the command receive mode starts. If data is received, the command receive mode starts, and processing is repeated from step SP3 again.

When the reader/writer 200 writes the IC tag 100, as shown in FIG. 9, the reader/writer 200 first sends the RF signal acquired by modulating the carrier based on the frame pulse (step SP11), issues a write command comprised of a write instruction, write destination address and write data, after a predetermined period has elapsed, and sends it to the IC tag 100 (step SP12). After sending the command, the frame pulse FP signal is sent during a predetermined period when the command is executed (step SP13). In the present embodiment, a read command comprised of a read instruction and a read destination address (address the same as the write destination specified for the write command) is sent after sending the write command, in order to confirm whether the write command has been normally executed (step SP14). And during a predetermined period when the command is executed, the frame pulse FP signal is sent (step SP15) and the reception of data which is transmitted according to the read command is waited. If the read data is received (step SP16: YES), it is checked whether the write data of the write command transmitted in step SP12 and the read data read from the IC tag 100 match (step SP17), and if they match the processing ends.

If they do not match, the processing returns to step SP12, for example, and the write command is transmitted again. When the write data and the read data do not match, it is possible that the IC tag 100 generated the error flag E1 which indicates that the command received in step SP4 was canceled. In other words, it is possible that the IC tag 100 could not execute the write command since the write command could not be normally received, and is judged as "NO" in step SP17. So if the reader/writer 200 transmits the error flag E1 read instruction and reads the error flag E1 from the IC tag 100, the reader/writer 200 can recognize the cause of the error of the IC tag 10O. In other words, it is unknown whether the cause of failure of normal execution of the write command is in the data transmission from the reader/writer 200 to the IC tag 100, or in the transmission circuit at the reader/writer 200 side, or in the writing to the memory at the IC tag 100 side, but if the reader/writer 200 can receive the error flag E1 generated in step SP4, the reader/writer 200 can recognize that the problem occurred in the data transmission from the reader/writer 200 to the IC tag 100. Therefore by handling this data transmission problem and resending the write command, the failures of the normal execution of the write command, due to the same cause, can be dramatically decreased.

The error flag E2 can be read from the IC tag 100 by transmitting the error flag E2 read instruction. If the communication status between the reader/writer 200 and the IC tag 100 is not good, the IC tag 100 generates the error flag E2 during the command execution period in SP12 or SP14, and stores the error flag E2 in the error flag E2 storage register 146. So the reader/writer 200 can know the communication status with the IC tag 100 by checking the generation of the error flag E2. Therefore if the error flag E2 is generated, that is if the communication status between the reader/writer 200 and the IC tag 100 is not good, this problem is handled first, then the error related to the transmission/reception of data caused by the same problem can be prevented.

If the IC tag 100 generates an error flag that can be identified for each command (e.g. error flag E1 for a read command, error flag E1 for a write command), the information on the presence of an error flag can be acquired and used efficiently. For example, when a read command and a write command are transmitted from the reader/writer 200 to the IC tag 100, the reader/writer 200 can acquire the error flag E1 for a read command and the error flag E1 for a write command all at once if the error flag E1 read instruction is sent. When only the error flag E1 for a read command has been generated, it is sufficient if only the read command is reexecuted, and when only the error flag E1 for a write command has been generated, it is sufficient only if the write command is reexecuted.

The reader/writer 200 may recognize the radio wave status between the reader/writer 200 and the IC tag 100 by receiving such an error signal as the error flag E1 or the error flag E2, and a warning tone may be sounded if necessary.

In the present embodiment, if a detection signal other than the DATA0 detection signal D3 and the DATA1 detection signal D4 is received in the command receive mode for receiving a command, the IC tag 100 judges that the currently receiving command cannot be correctly received, and cancels this command, so that a malfunction, such as decoding the command into an incorrect command, can be prevented, and by generating the error flag E1 at this time and voluntarily sending the error flag E1 to the reader/writer 200 according to the read instruction of the reader/writer 200, the failure of command reception can be notified to the reader/writer 200.

If a detection signal other than the frame pulse detection signal D2, such as the DATA0 detection signal D3 or the DATA1 detection signal D4, is received in the command execution mode, the IC tag 100 regards this as abnormal data and cancels it, so a malfunction, such as a stop or interrupt of the command execution operation based on the command received as a valid command, or recognizing abnormal data as a command, can be avoided.

If the IC tag 100 also generates the error flag E2 when an abnormal data is detected in the command execution mode, and voluntarily sends the error flag E2 to the reader/writer 200 according to the read instruction of the reader/writer 200, the reader/writer 200 can recognize how good the receive status is, and command receive errors by the IC tag 100 can be prevented or decreased.

As described above, even if the IC tag of the present invention is a passive type and has an extremely simple structure without a processing capability to execute error correction when incorrect data is received, the command receive mode and the command execution mode are switched, and if data other than data that is supposed to be received is received in each mode, the currently receiving command is canceled or the already received command is canceled, so the error operation of the IC tag can be prevented very easily.

It is apparent that the present invention is not limited to the above embodiment, that may be modified and changed without departing from the scope and spirit of the invention.

What is claimed is:

1. A semiconductor device for an IC tag, comprising:
   a receive unit for demodulating receive data from a received RF signal; and
   a signal processing unit for detecting a command comprising data signals from the receive data demodulated by the receive unit and executing processing based on the command, wherein the signal processing unit has a command acceptance mode and a command execution mode, the command execution mode for executing the command when the command has previously been detected from receive data in the command acceptance mode, and cancelling the command when the command is detected from the receive data in the command execution mode, wherein the signal processing unit generates an error signal when the command detected in the command execution mode is canceled.

2. The semiconductor device for an IC tag according to claim 1, comprising a power supply voltage generation unit for generating power supply voltage from the received RF signal.

3. The semiconductor device for an IC tag according to claim 1, wherein the signal processing unit comprises a detection unit for detecting the data signal from the receive data, and a control unit which operates based on the command comprised of the data signals.

4. The semiconductor device for an IC tag according to claim 1, comprising a register for storing the command, wherein the register is reset when the command execution mode changes to the command acceptance mode.

5. The semiconductor device for an IC tag according to claim 1, wherein the receive data comprise a plurality of pulses and the content of the receive data is judged to be a frame pulse signal only or a frame pulse signal with data signals based on the number of the pulses.

6. The semiconductor device for an IC tag according to claim 5, comprising a clock generation unit, wherein the clock generation unit generates a clock signal to be supplied to the signal processing unit based on at least one pulse out of the plurality of pulses of the receive data.

7. The semiconductor device for an IC tag according to claim 6, wherein the control unit comprises a counter circuit for counting the clock signals, and switches between the command acceptance mode and the command execution mode based on the count value of the counter circuit.

8. The semiconductor device for an IC tag according to claim 1, wherein the signal processing unit cancels the receive data in the command acceptance mode when receive data other than "0" or "1" data is received within a range of a predetermined number of data bits corresponding to a command.

9. An IC tag, comprising:
   a semiconductor device comprising:
      a receive unit for demodulating receive data from a received RF signal; and
      a signal processing unit for detecting a command comprising data signals from the receive data demodulated by the receive unit and executing processing based on the command, wherein the signal processing unit has a command acceptance mode and a command execution mode, the command execution mode for executing the command when the command has previously been detected from receive data in the command acceptance mode, and cancelling the command when the command is detected from the receive data in the command execution mode; and
   an antenna for transmitting/receiving radio waves to/from a reader/writer, the semiconductor device being connected to the antenna,
   wherein the signal processing unit generates an error signal when the command detected in the command execution mode is canceled.

10. A control method for an IC tag for receiving RF signals transmitted from a reader/writer and executing processing based on receive data acquired by demodulating the RF signals, the method comprising:

detecting by the IC tag whether a command comprising data signals is included in the receive data, executing the detected command in a command execution mode when the command has previously been detected from receive data in a command acceptance mode, canceling the command when the command is detected from the receive data in the command execution mode, and generating an error signal when the command detected in the command execution mode is canceled.

11. The control method for an IC tag according to claim 10, wherein the power supply voltage is generated from the received RF signals.

12. The control method for an IC tag according to claim 10, wherein the receive data comprise a plurality of pulses, and the content of the receive data is judged to be a frame pulse signal only or a frame pulse signal with data signals based on the number of the pulses.

13. The control method for an IC tag according to claim 12, wherein a clock signal is generated based on at least one of the plurality of pulses of the receive data.

14. The control method for an IC tag according to claim 13, wherein the command acceptance mode and the command execution mode are switched based on the value acquired by counting the clock signals.

* * * * *